(12) United States Patent
Chesna et al.

(10) Patent No.: US 12,216,301 B2
(45) Date of Patent: Feb. 4, 2025

(54) APPARATUSES AND METHODS FOR INSPECTING EMBEDDED FEATURES

(71) Applicant: Intel Corporation, Santa Clara, CA (US)

(72) Inventors: Jacob Chesna, Phoenix, AZ (US); Liang Zhang, Chandler, AZ (US); Jianyong Mo, Chandler, AZ (US); Fan Fan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 17/706,654

(22) Filed: Mar. 29, 2022

(65) Prior Publication Data

US 2023/0314682 A1    Oct. 5, 2023

(51) Int. Cl.
*G02B 5/30* (2006.01)
*G01L 1/24* (2006.01)
*G02B 5/20* (2006.01)
*G02B 5/26* (2006.01)

(52) U.S. Cl.
CPC ............ *G02B 5/3066* (2013.01); *G01L 1/248* (2013.01); *G02B 5/208* (2013.01); *G02B 5/26* (2013.01); *G02B 5/305* (2013.01)

(58) Field of Classification Search
CPC ........ G02B 5/3066; G02B 5/208; G02B 5/26; G02B 5/305; G01L 1/248
USPC .................................................... 359/485.01
See application file for complete search history.

(56) References Cited

U.S. PATENT DOCUMENTS

| | | | | |
|---|---|---|---|---|
| 2005/0254063 | A1* | 11/2005 | Hill | G03F 1/84 356/512 |
| 2008/0055606 | A1* | 3/2008 | Inoue | G01N 21/95607 356/521 |
| 2009/0323052 | A1* | 12/2009 | Silberstein | G01N 21/9501 356/237.5 |
| 2013/0301040 | A1* | 11/2013 | Ahner | G01N 21/94 356/237.2 |
| 2014/0268172 | A1* | 9/2014 | Salehpour | G01B 11/303 356/511 |
| 2017/0350826 | A1* | 12/2017 | Tian | G01N 21/9501 |

\* cited by examiner

*Primary Examiner* — William R Alexander
(74) *Attorney, Agent, or Firm* — Viering, Jentschura & Partner mbB

(57) ABSTRACT

An apparatus includes a light source configured to emit light to a translucent material and an embedded feature disposed in the translucent material, a first linear polarizer configured to linearly polarize the emitted light, based on a first orientation of an optical axis of the first linear polarizer, and a second linear polarizer configured to filter the light that is reflected from the translucent material, from the light that is reflected from the embedded feature and the translucent material, based on a second orientation of an optical axis of the second linear polarizer. The apparatus further includes a sensor configured to receive the light reflected from the embedded feature, from which the light reflected from the translucent material is filtered, and capture an image of the embedded feature and the translucent material, based on the received light.

20 Claims, 8 Drawing Sheets

APPARATUSES AND METHODS FOR INSPECTING EMBEDDED FEATURES

BACKGROUND

Embedded semiconductor dies may be placed in substrates composed of nonhomogeneous and semi-transparent materials, and overlay validation of these products may be performed. Specifically referring to processes for Embedded Multi-die Interconnect Bridge (EMIB), Omni-Directional Interconnect (ODI) and hybrid bonding products, die and substrate alignment fiducials may be covered mid-process with at least one film of organic material, such as an Ajinomoto Build-up Film (ABF) or a Die Attach Film (DAF). Given optical properties of the ABF (opaque or partially opaque in a visible light spectrum) coupled with high tolerance requirements, special precaution may need to be taken when inspecting embedded features that are obscured.

In detail, the typical organic material may be semi-transparent and filled with other material that scatters light. Thus, normal visible-spectrum tools may not image the obscured embedded features with enough contrast from the semi-transparent organic material, because the normal visible spectrum of light may not penetrate through the semi-transparent organic material. An additional challenge may be when inspection uncertainties for products are required to be orders of magnitude less than what current packaging assembly tools are capable of. Because organic layers like ABF may be both nonhomogeneous and partially opaque, their measurement uncertainties may be far from ideal.

BRIEF DESCRIPTION OF THE DRAWINGS

In the drawings, like reference characters generally refer to the same parts throughout the different views. The drawings are not necessarily to scale, emphasis instead generally being placed upon illustrating the present disclosure. The dimensions of the various features or elements may be arbitrarily principles expanded or reduced for clarity. In the following description, various aspects of the present disclosure are described with reference to the following drawings, in which.

DETAILED DESCRIPTION

Figure 1:
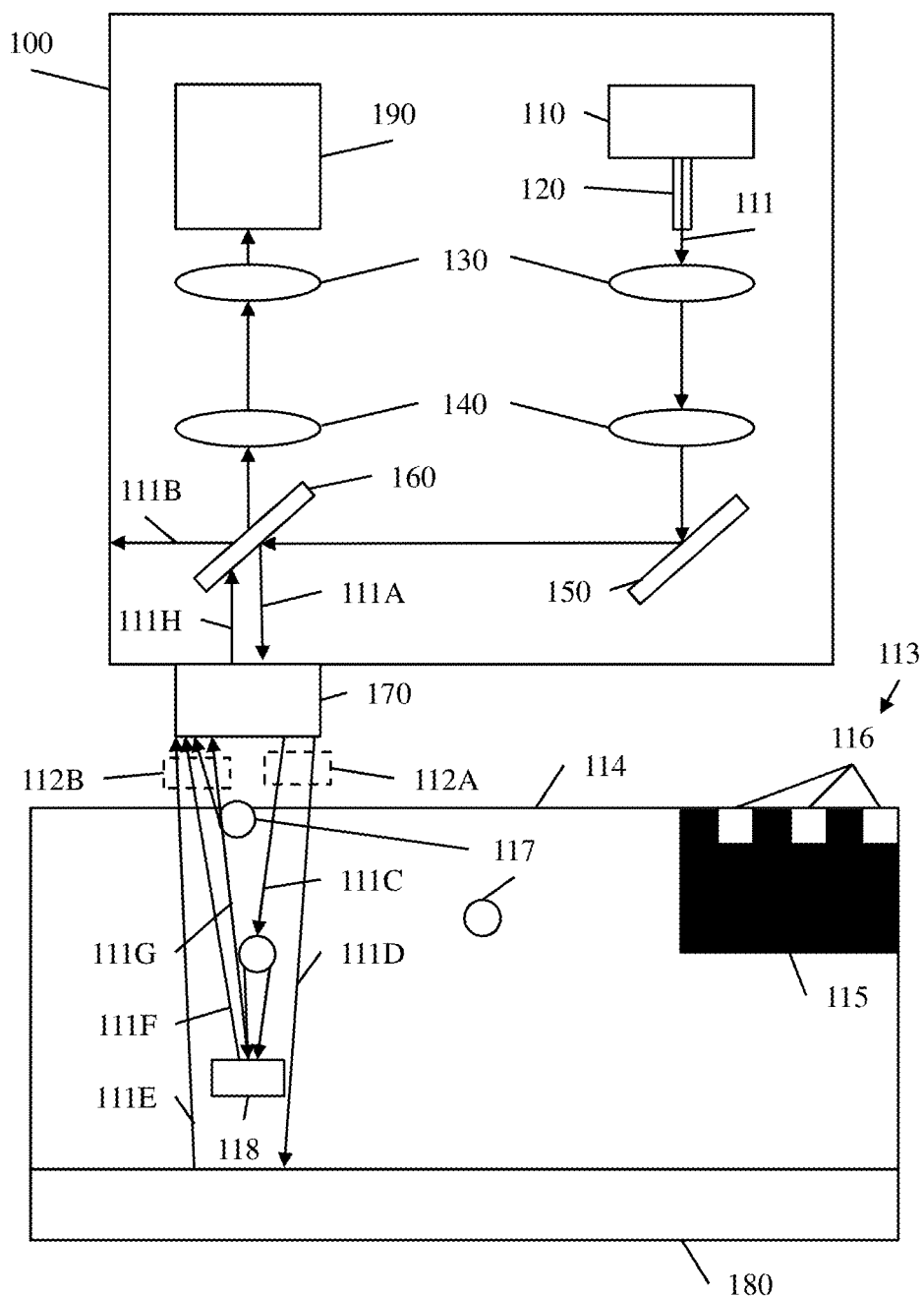
FIG. 1 is a diagram of an apparatus for inspecting embedded features, according to aspects of the present disclosure.

The following detailed description refers to the accompanying drawings that show, by way of illustration, specific details and aspects in which the present disclosure may be practiced. These aspects are described in sufficient detail to enable those skilled in the art to practice the present disclosure. Various aspects are provided for devices, and various aspects are provided for methods. It will be understood that the basic properties of the devices also hold for the methods and vice versa. Other aspects may be utilized and structural, and logical changes may be made without departing from the scope of the present disclosure. The various aspects are not necessarily mutually exclusive, as some aspects can be combined with one or more other aspects to form new aspects.

The present disclosure relates to apparatuses and methods for inspection of embedded features.

A present apparatus may include a light source configured to emit light to a translucent material and an embedded feature disposed in the translucent material, a first linear polarizer configured to linearly polarize the emitted light, based on a first orientation of an optical axis of the first linear polarizer, and a second linear polarizer configured to filter the light that is reflected from the translucent material, from the light that is reflected from the embedded feature and the translucent material, based on a second orientation of an optical axis of the second linear polarizer. The apparatus further includes a sensor configured to receive the light reflected from the embedded feature, from which the light reflected from the translucent material is filtered, and capture an image of the embedded feature and the translucent material, based on the received light.

In another aspect, a method pursuant to the present disclosure may include emitting, by a light source, light to a translucent material and an embedded feature disposed in the translucent material, linearly polarizing, by a first linear polarizer, the emitted light, based on a first orientation of an optical axis of the first linear polarizer, and filtering, by a second linear polarizer, the light that is reflected from the translucent material, from the light that is reflected from the embedded feature and the translucent material, based on a second orientation of an optical axis of the second linear polarizer. The method further includes receiving, by a sensor, the light reflected from the embedded feature, from which the light reflected from the translucent material is filtered, and capturing, by the sensor, an image of the embedded feature and the translucent material, based on the received light.

In yet another aspect, an apparatus may include emitting means for emitting light to a translucent material and an embedded feature disposed in the translucent material, first filtering means for linearly polarizing the emitted light, based on a first orientation of an optical axis of the first filtering means, and second filtering means for filtering the light that is reflected from the translucent material, from the light that is reflected from the embedded feature and the translucent material, based on a second orientation of an optical axis of the second linear polarizer. The apparatus further includes capturing means for receiving the light reflected from the embedded feature, from which the light reflected from the translucent material is filtered, and capturing an image of the embedded feature and the translucent material, based on the received light.

The above-detailed aspects may significantly increase contrast in an image of a semiconductor device by transmitting light in an NIR spectrum (e.g., having a wavelength in a range from about 700 nanometers (nm) to 1700 nanometers) through a translucent material, e.g., an organic substrate included in the semiconductor device, and by filtering scattered light using partially-crossed linear polarizers. Further, measurement and/or detection uncertainties may be greatly improved by considering machine design (sensor orientation) to leverage a full potential of machine vision libraries (subpixeling algorithms). These aspects may improve inspection and measurement of dimensional properties of one or more embedded features included in the semiconductor device, which may allow process control on EMIB, ODI and hybrid bonding products.

FIG. 1 is a diagram of an apparatus 100 for inspecting embedded features, according to aspects of the present disclosure.

Referring to FIG. 1, the apparatus 100 is an NIR polariscope including a light source 110, a waveguide 120, focusing optics 130, linear polarizers 140, a fold mirror 150, a beam splitter 160, an objective 170, a reflecting layer 180 and a sensor 190.

A polariscope is a device that uses two linear polarizers (one on each end of an optical path) to filter out specific types of light. Here, the apparatus 100 receives and evaluates a light beam path after it is reflected from a semiconductor device.

The light source 110 generates and emit light rays 111 to the waveguide 120. The emitted light rays 111 may be NIR light rays, e.g., having a wavelength in a range from about 700 nm to about 1700 nm. In an embodiment, the emitted light rays 111 have a wavelength of about 1100 nm. Advantageously, the NIR light rays may penetrate deep into the semiconductor device (e.g., an organic material) with little scattering, yet be reflective off at least one feature that is embedded deep in the semiconductor device, which will be further discussed with respect to FIGS. 2A, 2B, 3A and 3B.

The waveguide 120 guides the emitted light rays 111 to a first one of the focusing optics 130.

The first one of the focusing optics 130 focuses the guided light rays 111 onto a first one of the linear polarizers 140. The focusing optics 130 may include any type of, e.g., lens and curved mirrors.

The first one of the linear polarizers 140 may linearly polarize the focused light rays 111, based on a first orientation of an optical axis of the first one of the linear polarizers 140. The first orientation of the first one of the linear polarizers 140 may be tunable by a user of the apparatus 100, to improve contrast in an image of the semiconductor device, which will be further described with respect to FIG. 4.

The fold mirror 150 reflects the linearly-polarized light rays 111 to the beam splitter 160.

The beam splitter 160 splits the reflected light rays 111 into first light rays 111A and second light rays 111B. The first light rays 111A are directed toward the objective 170, and the second light rays 111B are directed in a same direction as that of the reflected light rays 111.

The objective 170 gathers and focuses the first light rays 111A in a light beam shape 112A, and transmits the first light rays 111A to a semiconductor device 113. The light beam shape 112A may be very structured.

In an example, the semiconductor device 113 may include an organic material 114 (a substrate) disposed on the reflecting layer 180, a semiconductor die 115 embedded in the organic material 114, metal layers 116 (e.g., gold layers) disposed on the semiconductor die 115, nonhomogeneous material 117 disposed in the organic material 114, and at least one embedded feature 118 embedded in the organic material 114. The organic material 114 may include an ABF or a DAF, and be translucent or semi-transparent. The semiconductor die 115 may be formed of silicon. The nonhomogeneous material 117 may be formed of any material that comes from production and strengthening of the organic material 114, such material including, e.g., fibers and/or balls of material bonded in a resin. The at least one embedded feature 118 may include a fiducial for aligning semiconductor die 115 in the organic material 114, and may be in any shape, e.g., circular, rectangular or square.

The transmitted first light rays 111A may include light rays 111C and 111D. The light ray 111C may be incident on a portion or piece of the nonhomogeneous material 117, and may be split into multiple light rays that are incident on the at least one embedded feature 118. The light ray 111D may be incident on the reflecting layer 180.

The reflecting layer 180 holds the semiconductor device 113, and may reflect light rays incident on the reflecting layer 180, e.g., the light ray 111D. In examples, the reflecting layer 180 may include a semiconductor manufacturing stage or a bare silicon wafer.

A light ray 111E corresponding to the light ray 111D may be reflected off the reflecting layer 180, and light rays 111F and 111G corresponding to the multiple light rays into which the light ray 111C is split may be reflected off the at least one embedded feature 118. The light ray 111G may be incident on a portion or piece of the nonhomogeneous material 117, and may be split into multiple light rays.

The objective 170 gathers and focuses the light rays 111E and 111F and the multiple light rays into which the light ray 111G is split, in a light beam shape 112B, and transmits these light rays as light rays 111H to the beam splitter 160. The light beam shape 112B may be broader than the light beam shape 112A, which would decrease a contrast or an ability to resolve features in an image of the semiconductor device 113 without further processing.

The beam splitter 160 allows the light rays 111H to pass through the beam splitter 160 to the second one of the linear polarizers 140.

The second one of the linear polarizers 140 may filter the light rays 111H, based on a second orientation of an optical axis of the second one of the linear polarizers 140. The light rays 111H may be filtered by filtering and maintaining a polarization of specular reflection from a top surface of the organic material 114, while allowing through and altering a polarization of diffusive reflection from the embedded feature 118. The light rays that are filtered may include scattered light and extraneous reflected light from the semiconductor device 113. The second orientation of the second one of the linear polarizers 140 may be tunable by the user of the apparatus 100, to improve contrast in the image of the semiconductor device 113, which will be further described with respect to FIG. 4.

A second one of the focusing optics 130 focuses the filtered light rays 111H onto the sensor 190.

The sensor 190 receives the focused light rays 111H, and captures the image of the semiconductor device 113, using the received light rays 111H. The user may use the captured image of the semiconductor device 113 to analyze the semiconductor device 113, namely, the at least one embedded feature 118 therein. The sensor 190 may be positioned or oriented at different angles with respect to the at least one embedded feature 118, to improve pixilation of the image of the semiconductor device 113, which will be further described with respect to FIG. 5.

Figure 2A:
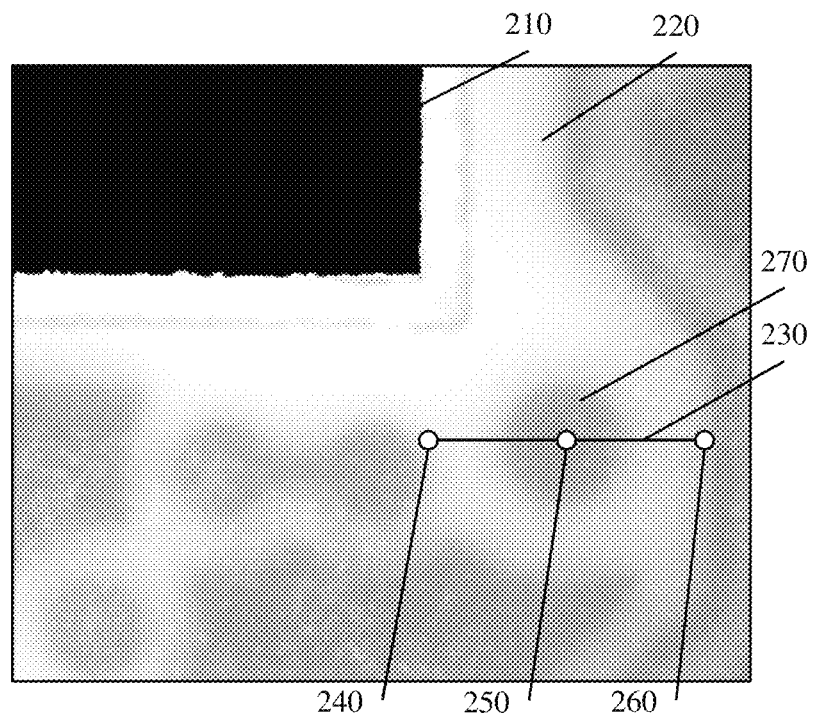
FIG. 2A is an image of a semiconductor die and an ABF that are captured using an optical microscope.
Figure 2B:
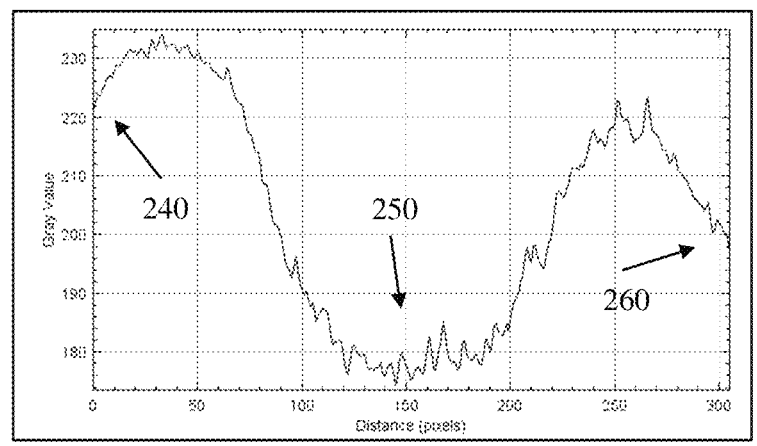
FIG. 2B is a graph of grey values along a line on the ABF of FIG. 2A.

FIG. 2A is an image of a semiconductor die 210 and an ABF 220 that are captured using an optical microscope. FIG. 2B is a graph of grey values along a line 230 on the ABF 220 of FIG. 2A.

Referring to FIGS. 2A and 2B, on the line 230, a pixel position 240 is on the ABF 220, a pixel position 250 is on an embedded feature 270, and a pixel position 260 is on the ABF 220. Starting from the pixel position 240 on the ABF 220, the grey values are high until around the pixel position 250 on the embedded feature 270, at which the grey values are low. The grey values become high again when the line 230 is on the ABF 220 again, until the pixel position 260 on the ABF 220. The semiconductor die 210 is shown in black.

Figure 3A:
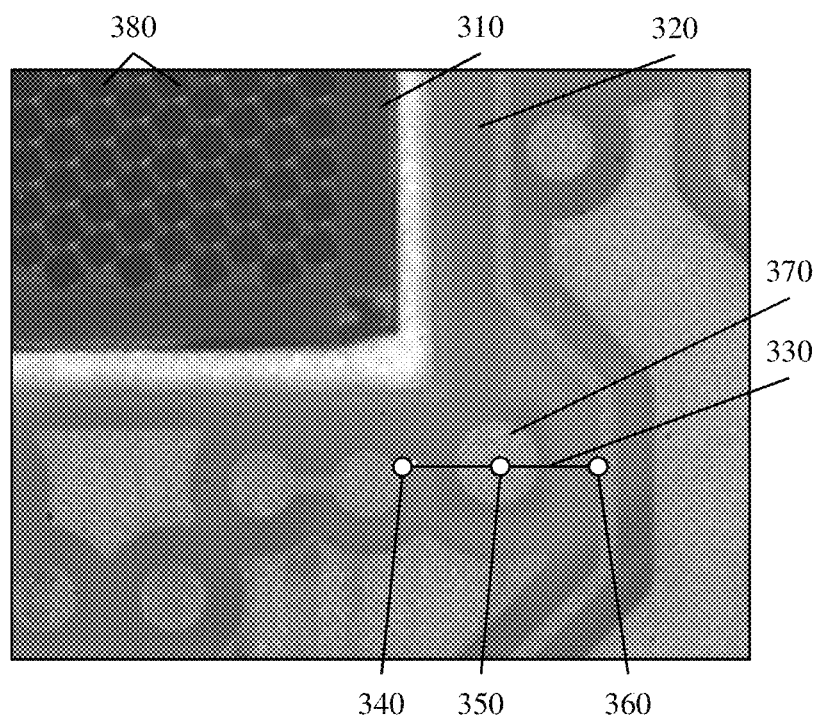
FIG. 3A is an image of a semiconductor die and an ABF that are captured using the apparatus of FIG. 1.
Figure 3B:
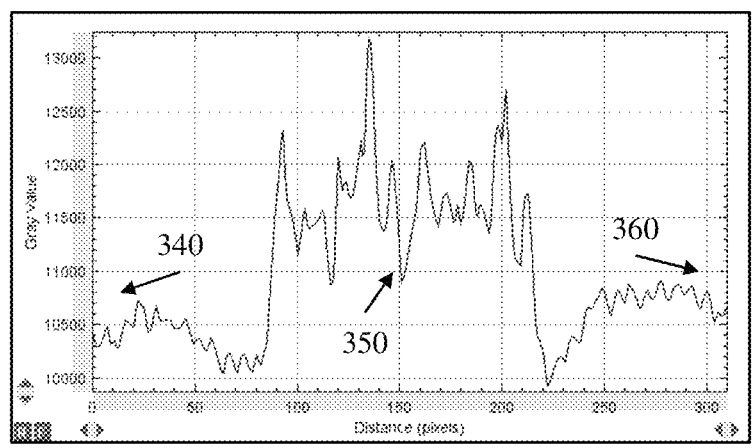
FIG. 3B is a graph of grey values along a line on the ABF of FIG. 3A.

FIG. 3A is an image of a semiconductor die 310 and an ABF 320 that are captured using the apparatus of FIG. 1. FIG. 3B is a graph of grey values along a line 330 on the ABF 320 of FIG. 3A.

Referring to FIGS. 3A and 3B, on the line 330, a pixel position 340 is on the ABF 320, a pixel position 350 is on an embedded feature 370, and a pixel position 360 is on the ABF 320. Starting from the pixel position 340 on the ABF 320, the grey values are low until around the pixel position 350 on the embedded feature 370, at which the grey values are high. The grey values become low again when the line 330 is on the ABF 320 again, until the pixel position 360 on the ABF 320. The semiconductor die 310 is shown in dark grey instead of black, and metal layers 380 (e.g., gold layers) disposed on the semiconductor die 310 are shown in darker grey.

Referring to FIGS. 2A-3B, because the apparatus 100 uses NIR light having a longer wavelength than light that is used in the optical microscope, there is less scattered light, and the embedded feature 370 of FIG. 3A is imaged with sharper, more contrasting edges than the embedded feature 270 of FIG. 2A. This is further demonstrated in FIG. 3B by sharper transitions between the grey values of the ABF 320 and the grey values of the embedded feature 370, in comparison to FIG. 2B. Also, the ABF 320 is optically most transparent within an NIR light band.

Additionally, because the apparatus 100 uses the linear polarizers 140, light reflected from a top surface of an ABF is suppressed or filtered, while a large portion of light reflected from an embedded feature is allowed therethrough, increasing contrast between surface types, e.g., the ABF and the embedded feature within the ABF. This results in more consistent grey values within each embedded feature (e.g., a higher signal-to-noise ratio), like the grey values of the embedded feature 370 of FIGS. 3A and 3B, in comparison to the grey values of the embedded feature 270 of FIGS. 2A and 2B. Also, the metal layers 380 may be seen in the image of FIG. 3A, but a metal layer cannot be seen in the image of FIG. 2A.

Figure 4:
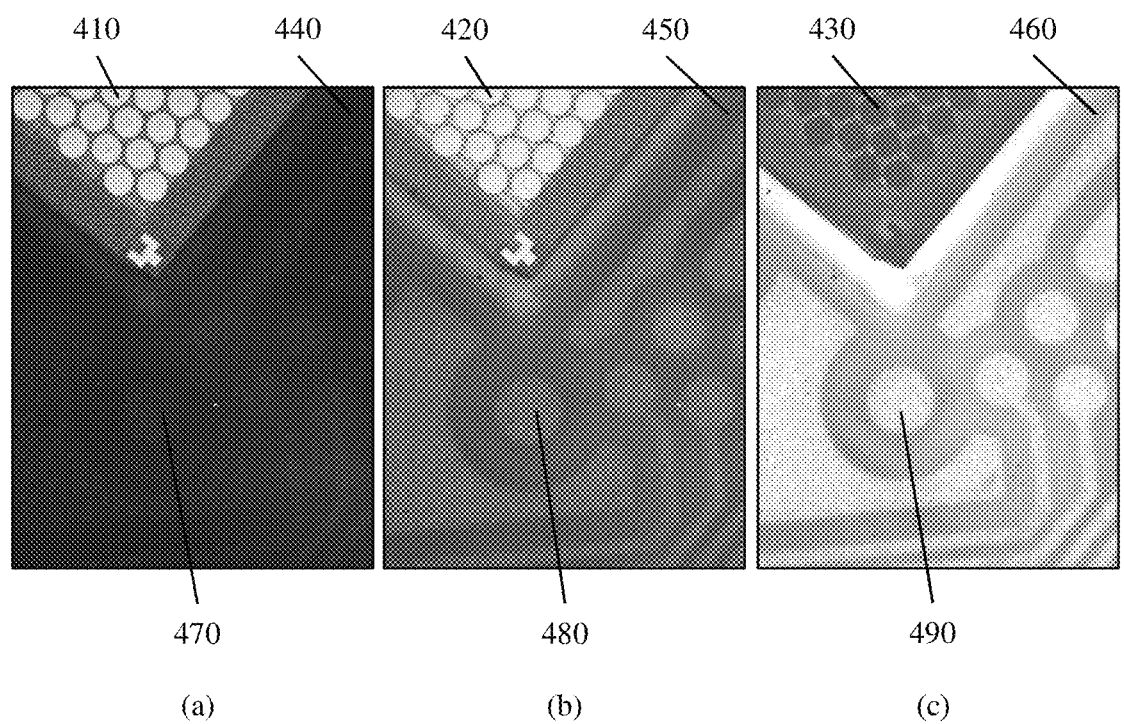
FIG. 4 are images of semiconductor dies and ABFs that are captured using near infrared (NIR) polariscopes including linear polarizers that are uncrossed, partially crossed and fully crossed, respectively, according to aspects of the present disclosure.

FIG. 4 are images of semiconductor dies 410, 420 and 430 and ABFs 440, 450 and 460 that are captured using NIR polariscopes including linear polarizers that are uncrossed, partially crossed and fully crossed, respectively, according to aspects of the present disclosure.

Referring to portion (a) of FIG. 4, the image is captured using the NIR polariscope including the linear polarizers that are uncrossed or having the same orientation. That is, a difference of orientations of the linear polarizers is zero, specular reflection from a top surface of the ABF 440 is mainly unfiltered, and diffusive reflection from an embedded feature 470 is partially filtered. Polarized light that is presented by a first linear polarizer to a semiconductor device is returned unchanged and therefore unblocked by a second linear polarizer prior to imaging. In an image of a polariscope, a pixel intensity is a function of captured light, so brighter pixels means a polarization of the light was somehow altered by the semiconductor device, e.g., scattering, birefringent material, etc. Thus, in the image of portion (a), while the semiconductor die 410 and metal layers (e.g., gold layers) therein may be seen, it may be difficult to see the ABF 440 and the embedded feature 470 therein. The embedded feature 470 in the ABF 440 is washed out in relative pixel variation by excellent contrast in the metal layers.

Referring to portion (b) of FIG. 4, the image is captured using the NIR polariscope including the linear polarizers that are partially crossed. That is, a second linear polarizer included in a beam path of light rays reflected off a semiconductor device is rotated to be 70 degrees different than a first linear polarizer included in a beam path of light rays from a light source. Thus, in the image, the semiconductor die 420 and metal layers (e.g., gold layers) therein may still be seen, and the ABF 450 and an embedded feature 480 therein may be seen with sharper, more contrasting edges. Thus, the linear polarizers may be tuned to be partially crossed to capture an optimized image in which all features of the semiconductor device may be seen clearly with sufficient sharpness and contrast. This allows measurement of dimensional properties of the embedded feature 480, the ABF 450 and the semiconductor die 420.

Referring to portion (c) of FIG. 4, the image is captured using the NIR polariscope including the linear polarizers that are fully crossed. That is, a second linear polarizer included in a beam path of light rays reflected off a semiconductor device is rotated to be 90 degrees different than a first linear polarizer included in a beam path of light rays from a light source. As a result, most or all polarized light that is presented by the first linear polarizer to the semiconductor device is returned blocked or filtered out by the second linear polarizer. Thus, in the image, while the ABF 460 and an embedded feature 490 therein may be seen with sharper, more contrasting edges, it may be difficult to see the semiconductor die 430 and metal layers (e.g., gold layers) therein. All or most light from the metal layers is blocked, and contrast suffers in features of the semiconductor die 430.

Referring again to FIG. 1, light is scattered as it travels through the nonhomogeneous material 117 included in the organic material 114. The linear polarizers 140 aid in rejecting this scattered light. This is why sharpness and contrast of an embedded feature included in an ABF increases as a difference angle between linear polarizers increases toward 90 degrees, as shown in portions (a)-(c) of FIG. 4. Further, reflections off a primary surface of the semiconductor device 113 are increasingly rejected as a difference angle between the linear polarizers 140 increases toward 90 degrees. This is why less light is received from a semiconductor die as the difference angle between the linear polarizers increases toward 90 degrees, as shown in portions (a)-(c) of FIG. 4.

Accordingly, the angles of the linear polarizers 140 may be tuned by the user of the apparatus 100 to compromise between high image contrast of the semiconductor die 115 and high image contrast of the at least one embedded feature 118 included in the organic material 114. In an example, a difference angle between the linear polarizers 140 of 10-20 degrees may provide a good compromise to see both the semiconductor die 115 and the at least one embedded feature 118. The difference angle between the linear polarizers 140 may be determined and optimized based on a design of each semiconductor device.

Figure 5:
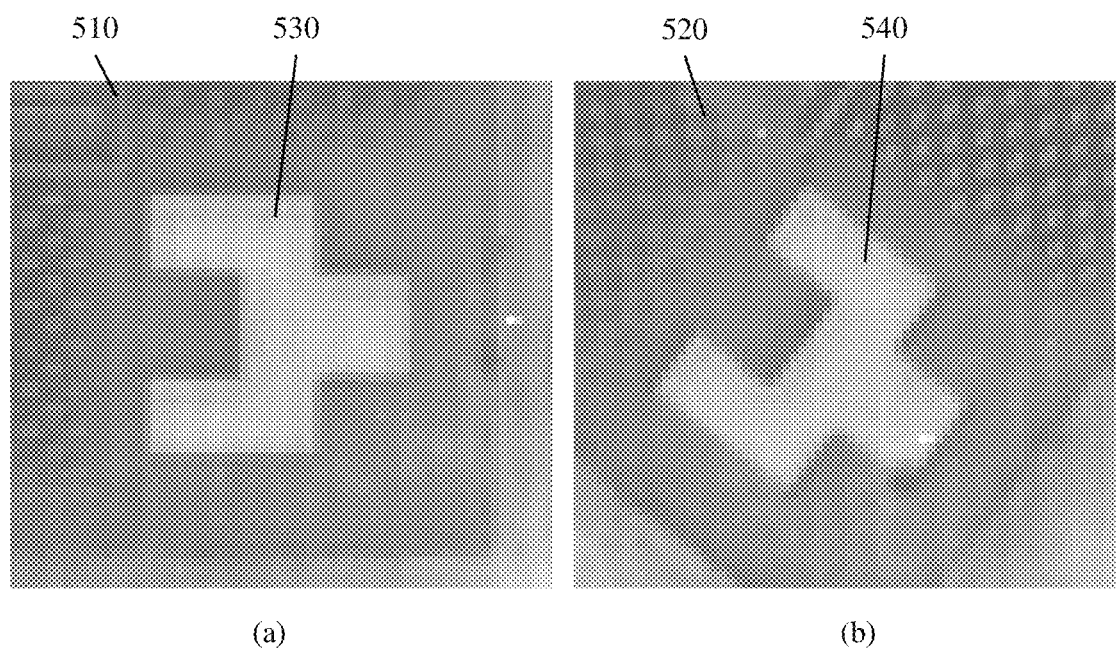
FIG. 5 are images of ABFs and embedded features therein that are captured using NIR polariscopes including NIR sensors disposed at different angles with respect to the embedded features, according to aspects of the present disclosure.

FIG. 5 are images of ABFs 510 and 520 and embedded features 530 and 540 therein that are captured using NIR polariscopes including NIR sensors disposed at different angles with respect to the embedded features 530 and 540, according to aspects of the present disclosure.

In a semiconductor device, square-type or rectangular-type fiducials may be used instead of traditional circular-type fiducials. This may affect accuracy of placing a semiconductor die into an organic material for the semiconductor device. Referring to FIG. 5, the same rectangular-type fiducial or embedded feature is imaged in two different orientations.

Referring to portion (a) of FIG. 5, the image is captured using the NIR polariscope including the NIR sensor disposed at a first angle with respect to the embedded feature 530. In detail, edges (e.g., leftmost and/or rightmost) of pixels of the NIR sensor may be aligned with corresponding edges (e.g., leftmost and/or rightmost) of the embedded feature 530 so that the first angle between the edges of the pixels and the corresponding edges of the embedded feature 530 may be approximately zero degrees. The embedded feature 530 appears highly pixelated. Most consequential, because a pixel resolution of the embedded feature 530 is not very high, a pixel size may be comparable to a size of the embedded feature 530, and thus subpixeling algorithms cannot be fully performed on the image. This limits analysis of semiconductor die placement in the ABF 510 to discrete intervals of pixel distances.

Referring to portion (b) of FIG. 5, the image is captured using the NIR polariscope including the NIR sensor disposed at a second angle with respect to the embedded feature 540. In detail, edges (e.g., leftmost and/or rightmost) of pixels of the NIR sensor may be misaligned or placed apart from corresponding edges (e.g., leftmost and/or rightmost) of the embedded feature 540 so that the second angle between the edges of the pixels and the corresponding edges of the embedded feature 530 may be 45 degrees. The embedded feature 540 appears less pixelated than the embedded feature 530 of portion (a). Thus, subpixeling algorithms can be fully performed on the image because the edges of the misaligned embedded feature 540 occupy more of the pixels than the corresponding edges of the aligned embedded feature 530. The additional occupied pixels provide more datapoints for the subpixeling algorithms, namely, edge detection calculation.

Referring again to FIG. 1, in an example, the sensor 190 may adjust its own position or orientation (e.g., angle) with respect to the semiconductor device 113, namely, the at least one embedded feature 118. In another example, the reflecting layer 180 may adjust a position or an orientation (e.g., angle) of the semiconductor device 114 (e.g., the at least one embedded feature 118) with respect to the sensor 190. In both examples, an angle between edges of pixels of the sensor 190 and corresponding edges of the at least one embedded feature 118 may be adjusted to be closer to 45 degrees.

Figure 6:
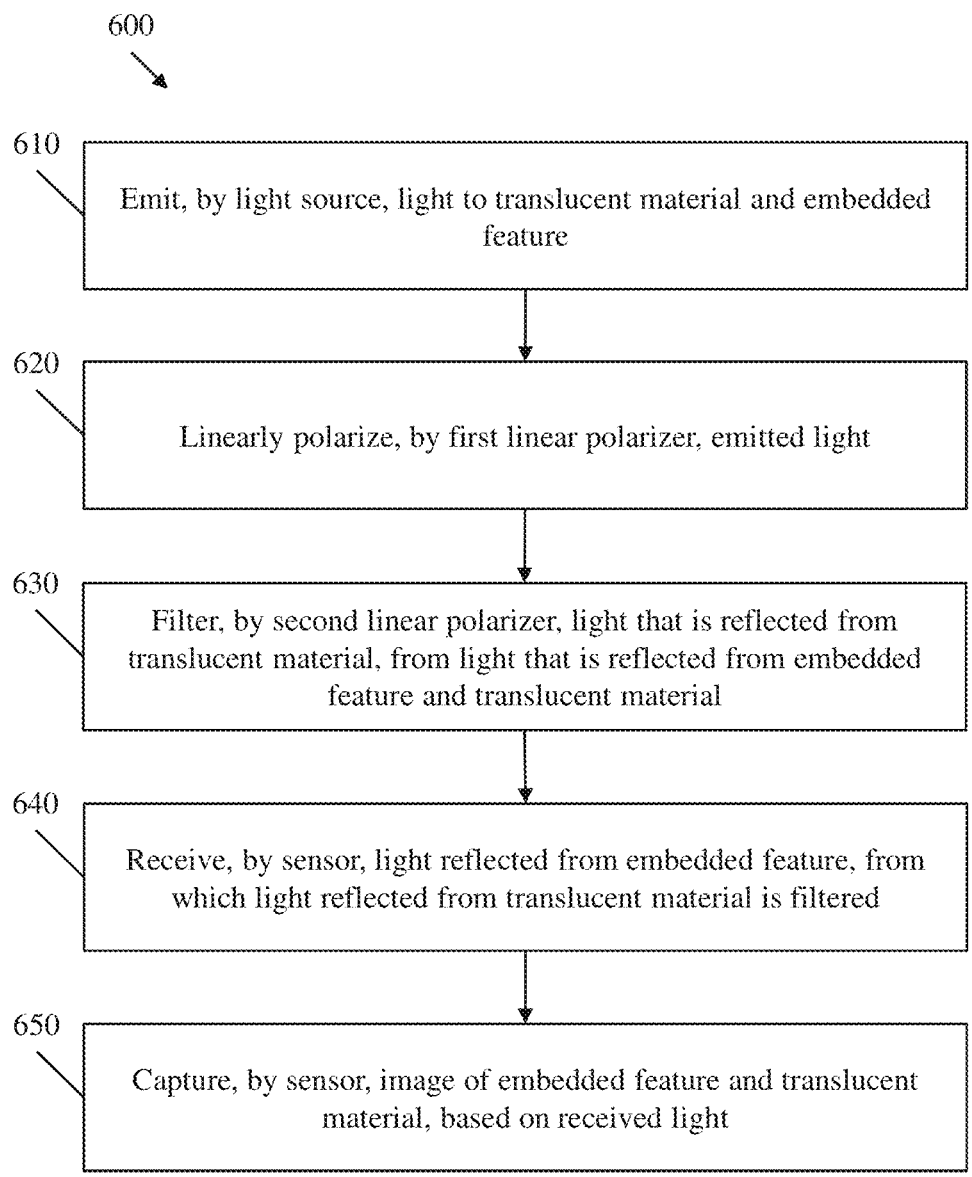
FIG. 6 is a flow diagram of a method of inspecting embedded features, according to aspects of the present disclosure.

FIG. 6 is a flow diagram of a method 600 of inspecting embedded features, according to aspects of the present disclosure.

Referring to FIG. 6, in operation 610, the method 600 includes emitting, by a light source, light to a translucent material and an embedded feature disposed in the translucent material.

In operation 620, the method 600 includes linearly polarizing, by a first linear polarizer, the emitted light, based on a first orientation of an optical axis of the first linear polarizer.

In operation 630, the method 600 includes filtering, by a second linear polarizer, the light that is reflected from the translucent material, from the light that is reflected from the embedded feature and the translucent material, based on a second orientation of an optical axis of the second linear polarizer. The difference between the first orientation of the first linear polarizer and the second orientation of the second linear polarizer may be in a range from 10 degrees to 20 degrees. The first orientation of the first linear polarizer and the second orientation of the second linear polarizer may further be tunable based on the captured image of the embedded feature and the translucent material.

In operation 640, the method 600 includes receiving, by a sensor, the light reflected from the embedded feature, from which the light reflected from the translucent material is filtered.

In operation 650, the method 600 includes capturing, by the sensor, an image of the embedded feature and the translucent material, based on the received light.

The method 600 may further include adjusting, by the sensor, an orientation of the sensor with respect to the embedded feature so that an angle between edges of pixels of the sensor and corresponding edges of the embedded feature is about 45 degrees.

The method 600 may further include adjusting, by a reflecting layer, an orientation of the embedded feature with respect to the sensor so that an angle between edges of pixels of the sensor and corresponding edges of the embedded feature is about 45 degrees.

The methods and sequence of steps presented above are intended to be examples for inspecting embedded features, according to the present disclosure. It will be apparent to those ordinary skilled practitioners that the foregoing process operations may be modified without departing from the spirit of the present disclosure.

Figure 7A:
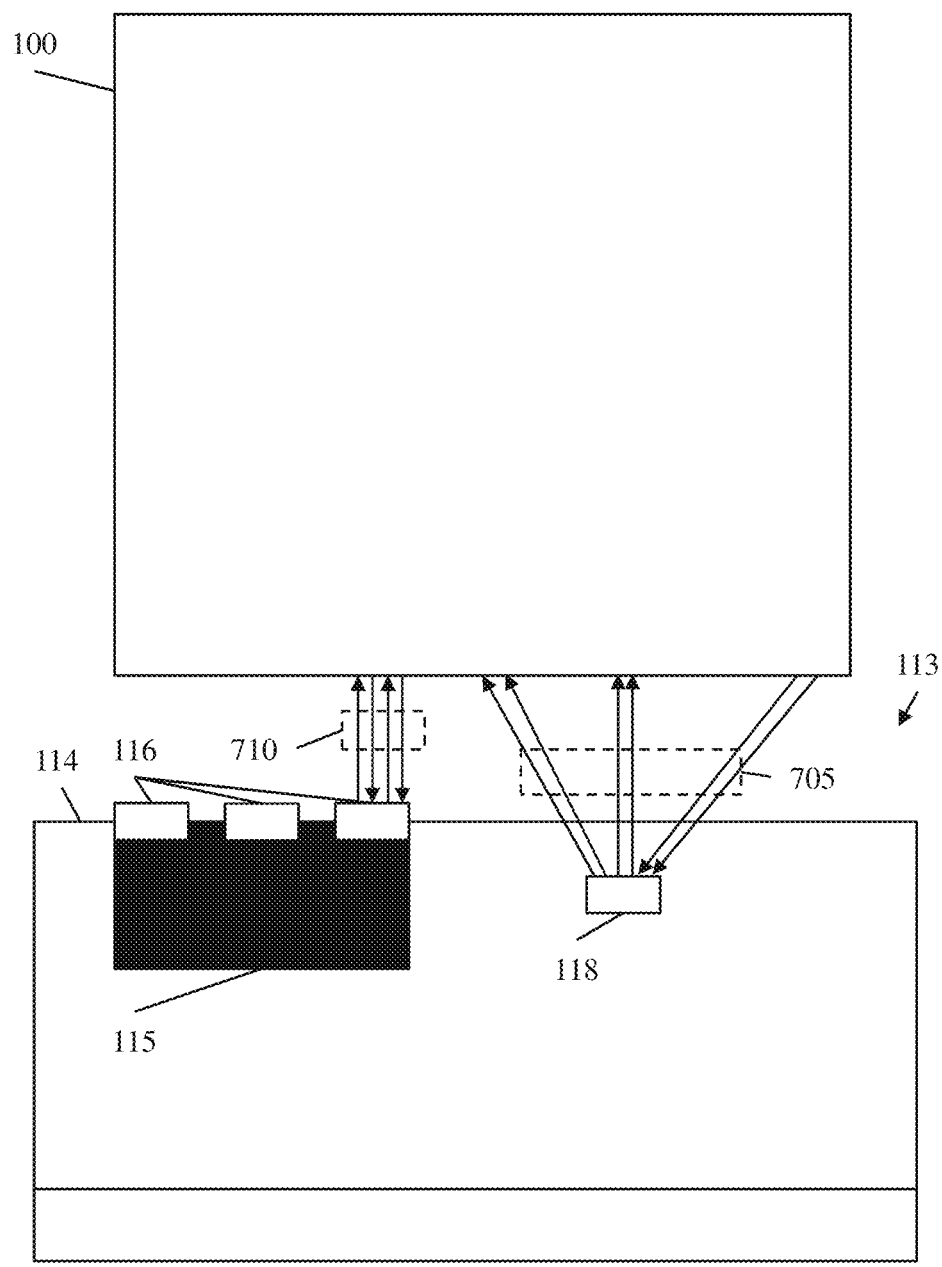
FIG. 7A is a diagram of the apparatus for inspecting embedded features, using an angular distribution of light, according to aspects of the present disclosure.
Figure 7B:
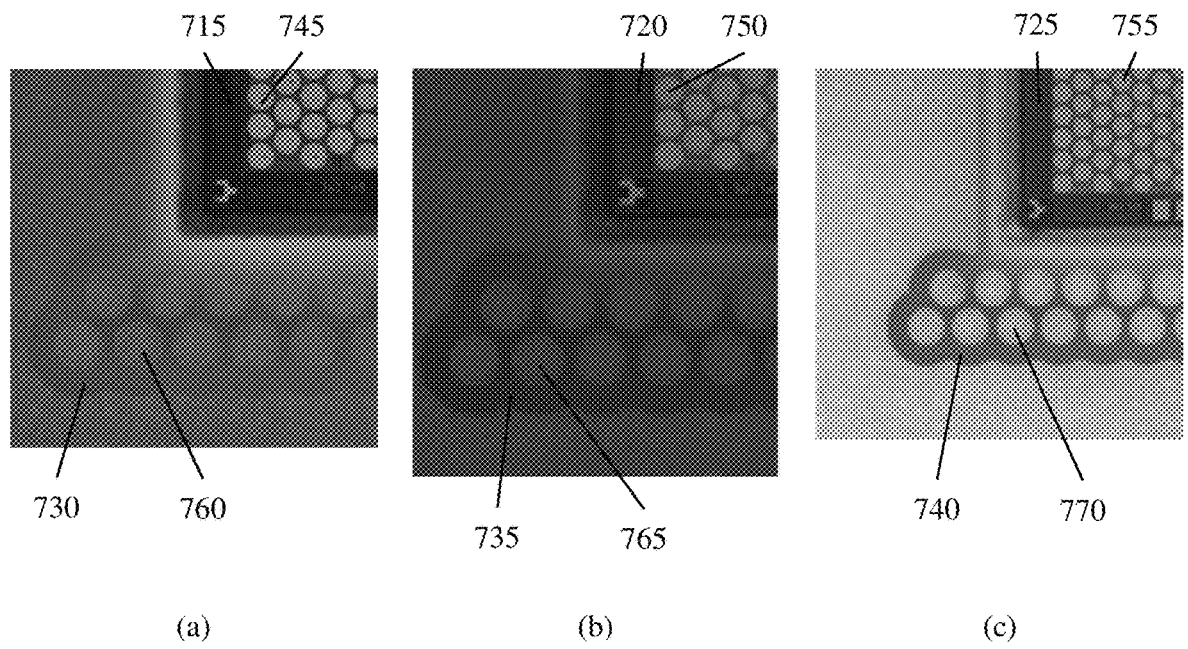
FIG. 7B are images of semiconductor dies and ABFs that are captured using the angular distribution of light of FIG. 7A.

FIG. 7A is a diagram of the apparatus 100 for inspecting embedded features, using an angular distribution of light, according to aspects of the present disclosure. FIG. 7B are images of semiconductor dies 715, 720 and 725 and ABFs 730, 735 and 740 that are captured using the angular distribution of light of FIG. 7A.

In a dark illumination case, a specular reflection of light that is emitted from an imaging system may reflect mainly off a top surface of materials and not towards a sensor of the imaging system. Meanwhile, a refractive beam of the light may penetrate deeper into the materials and diffusively reflect from an embedded feature due to its rough surface. A large portion of this reflected light may be detected by a sensor.

Thus, referring to FIGS. 1 and 7A, to capture an image with good contrast between the metal layers 116 disposed on the semiconductor die 115 and the embedded feature 118 and good contrast between the organic material 114 and the embedded feature 118, the apparatus 100 may emit oblique light rays 705 towards the embedded feature 118, while emitting normal light rays 710 towards another feature disposed adjacent a top surface of the semiconductor device 113, e.g., the metal layers 116. That is, the apparatus 100 may emit an angular distribution of light towards the semiconductor device 113, based on materials included in the semiconductor device 113. The oblique light rays 705 may be reflected off the embedded feature 118 at oblique and normal angles, and the normal light rays 710 may be reflected off the metal layers 116 at normal angles.

Because the apparatus 100 emits the angular distribution of light towards the semiconductor device 113, the apparatus 100 may receive adequate light that is reflected from both the metal layers 116 and the embedded feature 118, namely, more light reflected from the embedded feature 118, in comparison to the prior art. Thus, an image with good contrast between the metal layers 116 and the embedded feature 118 and good contrast between the organic material 114 and the embedded feature 118 may be captured.

For example, referring to FIG. 7B, portion (a) shows the image of the semiconductor die 715 and the ABF 730 captured using the angular distribution of light having a wavelength of about 630 nm, portion (b) shows the image of the semiconductor die 720 and the ABF 735 captured using the angular distribution of light having a wavelength of about 860 nm, and portion (c) shows the image of the semiconductor die 725 and the ABF 740 captured using the angular distribution of light having a wavelength of about 940 nm. In each of the three images, there is good contrast between fiducials 745, 750 or 755 disposed on a respective one of the semiconductor dies 715, 720 and 725 and fiducials 760, 765 or 770 embedded in a respective one of the ABFs 730, 735 and 740, and good contrast between the fiducials 760, 765 or 770 and the respective one of the ABFs 730, 735 and 740. The images further show that the above contrasts increase as the wavelengths used to capture the images increase.

To more readily understand and put into practical effect the present apparatuses and methods, particular aspects will now be described by way of examples. For the sake of brevity, duplicate descriptions of features and properties may be omitted.

EXAMPLES

Example 1 provides an apparatus including a light source configured to emit light to a translucent material and an embedded feature disposed in the translucent material, a first linear polarizer configured to linearly polarize the emitted light, based on a first orientation of an optical axis of the first linear polarizer, and a second linear polarizer configured to filter the light that is reflected from the translucent material, from the light that is reflected from the embedded feature and the translucent material, based on a second orientation of an optical axis of the second linear polarizer. The apparatus further includes a sensor configured to receive the light reflected from the embedded feature, from which the light reflected from the translucent material is filtered, and capture an image of the embedded feature and the translucent material, based on the received light.

Example 2 may include the apparatus of example 1 and/or any other example disclosed herein, for which the apparatus may be configured to emit oblique light rays, among the emitted light, towards the embedded feature Example 3 may include the apparatus of example 2 and/or any other example disclosed herein, for which the apparatus may be further configured to emit normal light rays, among the emitted light, towards another feature disposed adjacent a top surface of the translucent material Example 4 may include the apparatus of example 1 and/or any other example disclosed herein, for which a difference between the first orientation of the first linear polarizer and the second orientation of the second linear polarizer may be greater than 0 degrees and less than 90 degrees.

Example 5 may include the apparatus of example 4 and/or any other example disclosed herein, for which the difference between the first orientation of the first linear polarizer and the second orientation of the second linear polarizer may be in a range from 10 degrees to 20 degrees.

Example 6 may include the apparatus of example 1 and/or any other example disclosed herein, for which the first orientation of the first linear polarizer and the second orientation of the second linear polarizer may be tunable based on the captured image of the embedded feature and the translucent material.

Example 7 may include the apparatus of example 1 and/or any other example disclosed herein, for which the sensor may be further configured to adjust an orientation of the sensor with respect to the embedded feature so that an angle between edges of pixels of the sensor and corresponding edges of the embedded feature is greater than 0 degrees.

Example 8 may include the apparatus of example 7 and/or any other example disclosed herein, for which the angle between the edges of the pixels of the sensor and the corresponding edges of the embedded feature may be about 45 degrees.

Example 9 may include the apparatus of example 1 and/or any other example disclosed herein, further including a reflecting layer on which the translucent material is disposed, and configured to adjust an orientation of the embedded feature with respect to the sensor so that an angle between edges of pixels of the sensor and corresponding edges of the embedded feature is greater than 0 degrees.

Example 10 may include the apparatus of example 9 and/or any other example disclosed herein, for which the angle between the edges of the pixels of the sensor and the corresponding edges of the embedded feature may be about 45 degrees.

Example 11 provides a method including emitting, by a light source, light to a translucent material and an embedded feature disposed in the translucent material, linearly polarizing, by a first linear polarizer, the emitted light, based on a first orientation of an optical axis of the first linear polarizer, and filtering, by a second linear polarizer, the light that is reflected from the translucent material, from the light that is reflected from the embedded feature and the translucent material, based on a second orientation of an optical axis of the second linear polarizer. The method further includes receiving, by a sensor, the light reflected from the embedded feature, from which the light reflected from the translucent material is filtered, and capturing, by the sensor, an image of the embedded feature and the translucent material, based on the received light.

Example 12 may include the method of example 11 and/or any other example disclosed herein, further including emitting oblique light rays, among the emitted light, towards the embedded feature Example 13 may include the method of example 12 and/or any other example disclosed herein, further including emitting normal light rays, among the emitted light, towards another feature disposed adjacent a top surface of the translucent material Example 14 may include the method of example 11 and/or any other example disclosed herein, for which the difference between the first orientation of the first linear polarizer and the second orientation of the second linear polarizer may be in a range from 10 degrees to 20 degrees.

Example 15 may include the method of example 11 and/or any other example disclosed herein, for which the first orientation of the first linear polarizer and the second orientation of the second linear polarizer may be tunable based on the captured image of the embedded feature and the translucent material.

Example 16 may include the method of example 11 and/or any other example disclosed herein, further including adjusting, by the sensor, an orientation of the sensor with respect to the embedded feature so that an angle between edges of pixels of the sensor and corresponding edges of the embedded feature is about 45 degrees.

Example 17 may include the method of example 11 and/or any other example disclosed herein, further including adjusting, by a reflecting layer, an orientation of the embedded feature with respect to the sensor so that an angle between edges of pixels of the sensor and corresponding edges of the embedded feature is about 45 degrees.

Example 18 provides an apparatus including emitting means for emitting light to a translucent material and an embedded feature disposed in the translucent material, first filtering means for linearly polarizing the emitted light, based on a first orientation of an optical axis of the first filtering means, and second filtering means for filtering the light that is reflected from the translucent material, from the light that is reflected from the embedded feature and the translucent material, based on a second orientation of an optical axis of the second linear polarizer. The apparatus further includes capturing means for receiving the light that is reflected from the embedded feature, from which the light reflected from the translucent material is filtered, and capturing an image of the embedded feature and the translucent material, based on the received light.

Example 19 may include the apparatus of example 18 and/or any other example disclosed herein, for which the difference between the first orientation of the first filtering means and the second orientation of the second filtering means may be in a range from 10 degrees to 20 degrees.

Example 20 may include the apparatus of example 18 and/or any other example disclosed herein, for which the capturing means may be further for adjusting an orientation of the capturing means with respect to the embedded feature so that an angle between edges of pixels of the capturing means and corresponding edges of the embedded feature is about 45 degrees. The apparatus may further include adjusting means for adjusting an orientation of the embedded feature with respect to the capturing means so that the angle between the edges of the pixels of the capturing means and the corresponding edges of the embedded feature is about 45 degrees.

It will be understood that any property described herein for a specific device may also hold for any device described herein. It will also be understood that any property described herein for a specific method may hold for any of the methods described herein. Furthermore, it will be understood that for any device or method described herein, not necessarily all the components or operations described will be enclosed in the device or method, but only some (but not all) components or operations may be enclosed.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

The term "coupled" (or "connected") herein may be understood as electrically coupled or as mechanically coupled, e.g., attached or fixed or attached, or just in contact without any fixation, and it will be understood that both direct coupling or indirect coupling (in other words: coupling without direct contact) may be provided.

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

What is claimed is:

1. An apparatus comprising:
    a light source configured to emit light to a translucent material and an embedded feature disposed in the translucent material;
    a first linear polarizer configured to linearly polarize the emitted light, based on a first orientation of an optical axis of the first linear polarizer;
    a second linear polarizer configured to filter the light that is reflected from the translucent material, from the light that is reflected from the embedded feature and the translucent material, based on a second orientation of an optical axis of the second linear polarizer; and
    a sensor configured to:
        receive the light reflected from the embedded feature, from which the light reflected from the translucent material is filtered; and
        capture an image of the embedded feature and the translucent material, based on the received light.

2. The apparatus of claim 1, wherein the apparatus is configured to emit oblique light rays, among the emitted light, towards the embedded feature.

3. The apparatus of claim 2, wherein the apparatus is further configured to emit normal light rays, among the emitted light, towards another feature disposed adjacent a top surface of the translucent material.

4. The apparatus of claim 1, wherein a difference between the first orientation of the first linear polarizer and the second orientation of the second linear polarizer is greater than 0 degrees and less than 90 degrees.

5. The apparatus of claim 4, wherein the difference between the first orientation of the first linear polarizer and the second orientation of the second linear polarizer is in a range from 10 degrees to 20 degrees.

6. The apparatus of claim 1, wherein the first orientation of the first linear polarizer and the second orientation of the second linear polarizer are tunable based on the captured image of the embedded feature and the translucent material.

7. The apparatus of claim 1, wherein the sensor is further configured to adjust an orientation of the sensor with respect to the embedded feature so that an angle between edges of pixels of the sensor and corresponding edges of the embedded feature is greater than 0 degrees.

8. The apparatus of claim 7, wherein the angle between the edges of the pixels of the sensor and the corresponding edges of the embedded feature is about 45 degrees.

9. The apparatus of claim 1, further comprising a reflecting layer on which the translucent material is disposed, and configured to adjust an orientation of the embedded feature with respect to the sensor so that an angle between edges of pixels of the sensor and corresponding edges of the embedded feature is greater than 0 degrees.

10. The apparatus of claim 9, wherein the angle between the edges of the pixels of the sensor and the corresponding edges of the embedded feature is about 45 degrees.

11. A method comprising:
- emitting, by a light source, light to a translucent material and an embedded feature disposed in the translucent material;
- linearly polarizing, by a first linear polarizer, the emitted light, based on a first orientation of an optical axis of the first linear polarizer;
- filtering, by a second linear polarizer, the light that is reflected from the translucent material, from the light that is reflected from the embedded feature and the translucent material, based on a second orientation of an optical axis of the second linear polarizer;
- receiving, by a sensor, the light reflected from the embedded feature, from which the light reflected from the translucent material is filtered; and
- capturing, by the sensor, an image of the embedded feature and the translucent material, based on the received light.

12. The method of claim 11, further comprising emitting oblique light rays, among the emitted light, towards the embedded feature.

13. The method of claim 12, further comprising emitting normal light rays, among the emitted light, towards another feature disposed adjacent a top surface of the translucent material.

14. The method of claim 11, wherein the difference between the first orientation of the first linear polarizer and the second orientation of the second linear polarizer is in a range from 10 degrees to 20 degrees.

15. The method of claim 11, wherein the first orientation of the first linear polarizer and the second orientation of the second linear polarizer are tunable based on the captured image of the embedded feature and the translucent material.

16. The method of claim 11, further comprising adjusting, by the sensor, an orientation of the sensor with respect to the embedded feature so that an angle between edges of pixels of the sensor and corresponding edges of the embedded feature is about 45 degrees.

17. The method of claim 11, further comprising adjusting, by a reflecting layer, an orientation of the embedded feature with respect to the sensor so that an angle between edges of pixels of the sensor and corresponding edges of the embedded feature is about 45 degrees.

18. An apparatus comprising:
- emitting means for emitting light to a translucent material and an embedded feature disposed in the translucent material;
- first filtering means for linearly polarizing the emitted light, based on a first orientation of an optical axis of the first filtering means;
- second filtering means for filtering the light that is reflected from the translucent material, from the light that is reflected from the embedded feature and the translucent material, based on a second orientation of an optical axis of the second linear polarizer; and
- capturing means for:
  - receiving the light that is reflected from the embedded feature, from which the light reflected from the translucent material is filtered; and
  - capturing an image of the embedded feature and the translucent material, based on the received light.

19. The apparatus of claim 18, wherein the difference between the first orientation of the first filtering means and the second orientation of the second filtering means is in a range from 10 degrees to 20 degrees.

20. The apparatus of claim 18, wherein the capturing means is further for adjusting an orientation of the capturing means with respect to the embedded feature so that an angle between edges of pixels of the capturing means and corresponding edges of the embedded feature is about 45 degrees, and
- the apparatus further comprises adjusting means for adjusting an orientation of the embedded feature with respect to the capturing means so that the angle between the edges of the pixels of the capturing means and the corresponding edges of the embedded feature is about 45 degrees.

* * * * *